(12) United States Patent
Saxer-Felici et al.

(10) Patent No.: US 9,382,804 B2
(45) Date of Patent: Jul. 5, 2016

(54) COOLED BLADE FOR A GAS TURBINE

(71) Applicant: ALSTOM Technology Ltd, Baden (CH)

(72) Inventors: Helen Marie Saxer-Felici, Mellingen (CH); Shailendra Naik, Gebenstorf (CH); Martin Schnieder, Ennetbaden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 444 days.

(21) Appl. No.: 13/933,548

(22) Filed: Jul. 2, 2013

(65) Prior Publication Data

US 2014/0037460 A1 Feb. 6, 2014

(30) Foreign Application Priority Data

Jul. 2, 2012 (EP) .................................... 12174622

(51) Int. Cl.
*F01D 5/18* (2006.01)
(52) U.S. Cl.
CPC ................ *F01D 5/186* (2013.01); *F01D 5/187* (2013.01); *F05D 2240/303* (2013.01); *F05D 2240/304* (2013.01); *F05D 2250/185* (2013.01); *F05D 2260/2212* (2013.01); *F05D 2260/22141* (2013.01)
(58) Field of Classification Search
CPC ........... F01D 5/186; F01D 5/187; F01D 9/06; F05D 2260/202; F05D 2260/2212; F05D 2260/22141; F05D 2250/185; F05D 2240/304
USPC ....................... 415/115; 416/96 R, 96 A, 97 R
See application file for complete search history.

(56) References Cited

U.S. PATENT DOCUMENTS

| 4,278,400 | A | | 7/1981 | Yamarik et al. | |
|---|---|---|---|---|---|
| 4,601,638 | A | * | 7/1986 | Hill | F01D 5/186 415/115 |
| 4,992,026 | A | * | 2/1991 | Ohtomo | F01D 5/187 415/115 |
| 5,288,207 | A | | 2/1994 | Linask | |
| 6,241,466 | B1 | * | 6/2001 | Tung | F01D 5/186 415/115 |
| 6,270,317 | B1 | | 8/2001 | Manning et al. | |
| 6,347,923 | B1 | | 2/2002 | Semmler et al. | |

(Continued)

FOREIGN PATENT DOCUMENTS

| CN | 101769170 A | 7/2010 |
|---|---|---|
| CN | 102333935 A | 1/2012 |

(Continued)

*Primary Examiner* — Christopher Verdier
(74) *Attorney, Agent, or Firm* — Buchanan Ingersoll & Rooney PC

(57) ABSTRACT

A cooled blade is disclosed for a gas turbine that includes a radially extending aerofoil with a leading edge, a trailing edge, a suction side and a pressure side, and wherein a lip overhang is provided on the suction side of the trailing edge The blade also includes a plurality of radial internal flow channels connected via flow bends to form a multi-pass serpentine for a coolant flow, whereby a trailing edge ejection region is provided for cooling the trailing edge, the trailing edge ejection region comprising a trailing edge passage of the multi-pass serpentine running essentially parallel to the trailing edge and being connected over its entire length with a pressure side bleed. An optimized cooling is achieved by also determining the cooling flow from the trailing edge passage to the pressure side bleed by means of a staggered field of pins.

10 Claims, 3 Drawing Sheets

(56) References Cited

U.S. PATENT DOCUMENTS

| | | | |
|---|---|---|---|
| 2005/0106007 A1* | 5/2005 | Mongillo | F01D 5/187 415/115 |
| 2005/0135933 A1 | 6/2005 | Gregg et al. | |
| 2006/0107668 A1* | 5/2006 | Cunha | F01D 5/18 60/806 |
| 2010/0254801 A1 | 10/2010 | Tibbott | |
| 2011/0103932 A1* | 5/2011 | Dueckershoff | F01D 5/187 415/115 |
| 2012/0020787 A1* | 1/2012 | Kruckels | F01D 5/187 416/1 |
| 2012/0269615 A1* | 10/2012 | Kuwabara | F01D 5/187 415/116 |
| 2013/0017064 A1* | 1/2013 | Naik | F01D 5/187 415/115 |

FOREIGN PATENT DOCUMENTS

| | | |
|---|---|---|
| EP | 1 340 884 | 9/2003 |
| EP | 1 548 230 | 6/2005 |
| EP | 1 707 741 | 10/2006 |
| EP | 1 715 139 | 10/2006 |
| EP | 1 884 622 | 2/2008 |
| GB | 2 112 468 | 7/1983 |
| JP | S61-118502 | 6/1986 |
| RU | 1228599 A1 | 10/1996 |
| RU | 1287678 A2 | 2/1997 |
| WO | 2010/086419 | 8/2010 |

\* cited by examiner

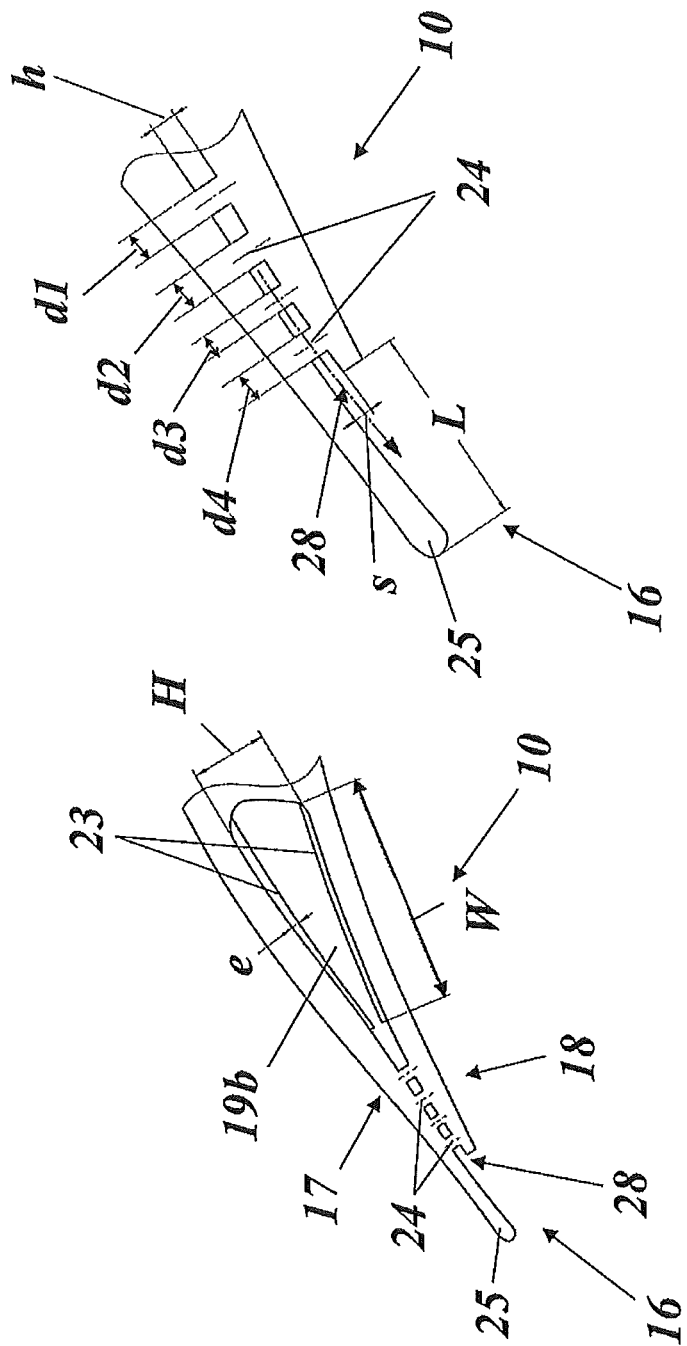

COOLED BLADE FOR A GAS TURBINE

CROSS-REFERENCE TO RELATED APPLICATIONS

This application claims priority to EP Application 12174622.6 filed Jul. 2, 2012, the contents of which are hereby incorporated in its entirety.

TECHNICAL FIELD

The present invention relates to the cooling system at the trailing region of a shrouded gas turbine blade which is exposed to hot gas temperatures and pressures in excess of 1200K and 6 bar, respectively.

BACKGROUND

FIG. 1 shows the basic design of a gas turbine blade with trailing edge cooling means, which consists in radial flow channels connected via flow bends to form a multi-pass serpentine.

The blade 10 of FIG. 1 comprises an aerofoil 11 extending in radial direction with a leading edge 15 and a trailing edge 16, a suction side 17 and a pressure side 18. At the lower end of the aerofoil 11 a platform 12 is provided for defining the inner wall of a hot gas path. Below the platform 12, the blade 10 has a shaft 13, which transforms into a root 14 with a well-known fir tree profile. In the interior of the aerofoil 11 a plurality of radial, parallel flow channels are provided, which guide a cooling flow 20 in a serpentine way. A trailing edge ejection region 21 is designed to establish a pressure side bleed 28 for cooling the trailing edge 16.

This arrangement can lead, under certain operating conditions, to excessively high coolant and metal temperatures at the blade trailing edge 16. Particular attention should, therefore, be paid to the cooling of the trailing edge region. For efficiency purposes, the trailing edge 16 should remain as thin as possible and the trailing-edge cooling should be restricted only to what is required. Also the cooling of the trailing edge 16 should be uniform to avoid mechanical integrity penalties. The cooling design of the trailing edge region becomes more critical when using re-cooled cooling air (reduced cooling air requirements).

Document EP 1 707 741 A2 discloses a hollow cooled airfoil, which includes an array of radially-spaced apart, longitudinally-extending partitions defining a plurality of cooling channels there between. A plurality of aft pins is disposed in at least one of the cooling channels. Elongated turbulators are disposed in at least one of the cooling channels, and are oriented at an angle to a longitudinal axis of the vane such that an aft end of each of the turbulators is closer to an adjacent partition than a forward end of the turbulator. The vane includes an array of radially-spaced apart, longitudinally-extending lands and longitudinally-extending dividers which define plurality of trailing edge slots there between. Each of the trailing edge slots has an inlet in fluid communication with a trailing edge cavity and an axially-downstream exit in fluid communication with the vane's trailing edge. The dividers have an axial length less than an axial length of the lands. The mixture of aft pins, turbulators, dividers, partitions and lands is quite complicated, such that an optimization of the cooling flow is extremely difficult.

Document U.S. Pat. No. 5,288,207 A teaches a turbine airfoil having a baffleless cooling passage for directing cooling fluid toward a trailing edge. Various construction details are developed which provide axially oriented, interrupted channels for turning a flow of cooling fluid from a radial direction to an axial direction. In a particular embodiment, the turbine airfoil has a cooling passage including a plurality of radially spaced walls, a plurality of radially spaced dividers downstream of the walls, and a plurality of radially spaced pedestals positioned axially between the walls and dividers. The walls and dividers define channels having an axial interruption permitting cross flow between adjacent channels. The cross flow minimizes the adverse affects of a blockage within a sub-channel between adjacent walls. The pedestals are aligned with the sub-channels such that cooling fluid exiting a sub-channel impinges upon the pedestal. The combination of interrupted channels and a pedestal or pin within each channel is on one hand simple but on the other hand not flexible enough to optimize the cooling requirements for different areas of the trailing edge region.

Document EP 1 340 884 A2 discloses an airfoil for a gas turbine engine nozzle, said airfoil comprising a first sidewall and a second sidewall connected at a trailing edge such that a cavity is defined there between, each said sidewall extending radially between an airfoil root and tip, said first sidewall comprising a plurality of slots extending towards said trailing edge, said airfoil further comprising a plurality of pins and at least a row of turbulators, said pins extending between said first and second sidewalls, said turbulators extending between said pins and said slots. The combination of slots, pins and turbulators is of low flexibility, as all slots, pins and turbulators have essentially the same geometry and dimensions.

Document EP 1 715 139 A2 teaches an airfoil having a pressure side wall having a span-wise extending downstream edge and a suction side wall having a downstream trailing edge, said downstream edge being spaced from said trailing edge to expose a back surface of said suction side wall, comprising; a span-wise cooling air cavity defined between said pressure and suction side walls; a trailing edge region disposed downstream of said cavity; a span-wise extending slot fluidly interconnecting said cooling air cavity to said trailing edge region; wherein said slot includes a plurality of pedestals extending between said suction side and pressure side walls and through said slot, said pedestals being disposed in span wise extending rows with the most upstream row having pedestals of greater cross sectional dimension and those more downstream rows having pedestals of lesser cross sectional dimension. This disclosed distribution of cross sectional dimensions along the cooling flow direction is intended to provide for a smooth transition and pressure drop, resulting in a more continuous heat transfer coefficient. However, the cooling of the fragile trailing edge is far from being optimal.

Document WO 2010/086419 A1 discloses a cooled vane for a gas turbine comprising an airfoil which extends between a leading edge and a trailing edge in the direction of flow and is respectively delimited by a wall on the suction side and the pressure side. Said walls enclose an interior, inside which cooling air flows to the trailing edge in the direction of flow and is discharged in the region of the trailing edge. In order to reduce aerodynamic losses on the trailing edge and the amount of cooling air used in such a vane, the wall on the pressure side ends at a distance from the trailing edge in the direction of flow so as to form a lip on the pressure side such that the cooling air is discharged from the interior on the pressure side. Furthermore, at a distance from the trailing edge, the interior is subdivided into a multitude of parallel cooling ducts causing a great drop in pressure by means of a multitude of ribs that are oriented parallel to the direction of flow, turbulators are arranged inside the cooling ducts to increase the cooling effect, and a plurality of flow barriers is distributed transversely to the direction of flow within the flow path of the cooling air at a short distance upstream of the point where the cooling air is discharged from the interior. A plurality of pins with identical dimensions is distributed between the cooling ducts and the flow barriers.

Document EP 1 548 230 A2 discloses a cooled blade for a gas turbine, comprising a radially extending aerofoil with a leading edge, a trailing edge, a suction and a pressure side, a plurality of internal flow channels connected via flow bends to form a serpentine for a coolant flow, a trailing edge ejection region being connected over its entire length with a bleed opening, whereby the cooling flow from the trailing edge passage to the bleed opening is mainly determined by a staggered field of pedestals, which is provided between said bleed opening and said trailing edge passage. The lateral dimension of the pedestals increases in the coolant flow direction.

SUMMARY

It is an object of the present invention to provide a cooled blade for a gas turbine, which has an optimized local heat transfer, reduced hot to cold variations over the overhang and meets the requirements with regard to local flow, heat transfer and manufacturing criteria.

The cooled blade for a gas turbine according to the invention comprises a radially extending aerofoil with a leading edge, a trailing edge, a suction side and a pressure side, whereby a lip overhang is provided on the suction side of the trailing edge, further comprising a plurality of radial internal flow channels connected via flow bends to form a multi-pass serpentine for a coolant flow, whereby a trailing edge ejection region is provided for cooling said trailing edge, said trailing edge ejection region comprising a trailing edge passage of said multi-pass serpentine running essentially parallel to said trailing edge and being connected over its entire length with a pressure side bleed. It is characterized in that the cooling flow from the trailing edge passage to the pressure side bleed is mainly determined by a staggered field of pins, which is provided between said pressure side bleed and said trailing edge passage, with the lateral dimension of said pins increasing in coolant flow direction, wherein in the hub and tip regions of said blade a local hub and pin field with an increased number of pins is provided in order to meet the local flow, heat transfer and manufacturing criteria and at least within the local hub and tip pin field, the pins are arranged in straight rows, which are inclined with respect to an axial direction by a predetermined angle.

According to an embodiment of the invention the pins have a circular cross section with a predetermined diameter and a predetermined height, and that the height to diameter ratio h/d for each pin ranges from 0.5 to 2.0.

According to another embodiment of the invention the pins of said pin field have a predetermined axial and radial spacing, and that the axial and radial spacing to pin diameter ratios $s_x/d$ and $s_y/d$ vary from 1.5 to 4.0.

According to another embodiment of the invention the coolant flows through a bend to enter said trailing edge passage, and that the shape of the bend is designed to minimize the aerodynamic losses.

Specific elite, the cross-area of the bend is contracting along the flow path.

More specifically, the contraction of the cross-area of said bend ranges from 5% to 15%.

According to a further embodiment of the invention the cross-area of the trailing edge passage converges in radial direction by a factor in the range from 20 to 30.

According to just another embodiment of the invention said trailing-edge passage is lined with turbulators on both the pressure and the suction sides to increase the flow turbulence and to improve the heat transfer.

Specifically, said turbulators are arranged in flow direction with a predetermined pitch and have a predetermined turbulator height, and that the turbulator height to pitch ratio e/P ranges from 0.05 to 0.15.

According to a further embodiment of the invention the said lip overhang has a predetermined length, that said pressure side bleed has a predetermined slot width, and that the length of the lip overhang to the pressure side slot width ratio L/s ranges from 7 to 15.

BRIEF DESCRIPTION OF THE DRAWINGS

The present invention is now to be explained more closely by means of different embodiments and with reference to the attached drawings.

FIG. 3 shows in a cross-section the dimensions of the turbulators and the pin field at the trailing edge of the blade according to FIG. 2;

FIG. 4 shows in a cross-section the dimensions of the lip overhang and the pins of the pin field at the trailing edge of the blade according to FIG. 2;

DETAILED DESCRIPTION

Figures 1, 2:
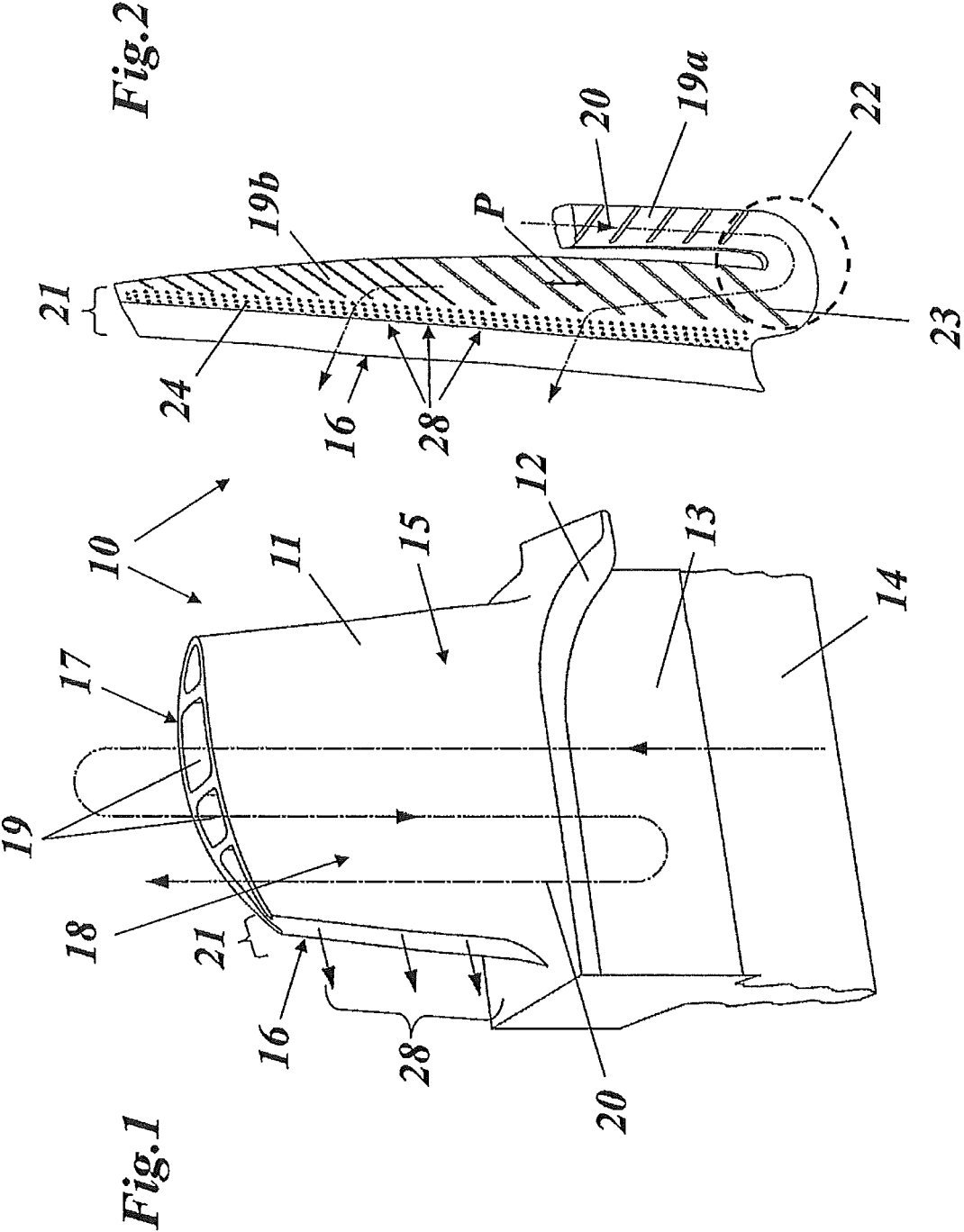
FIG. 1 shows an exemplary gas turbine blade with internal cooling of the aerofoil.
FIG. 2 shows particulars of the trailing edge cooling according to an embodiment of the invention.

The general arrangement of the cooling design at the trailing-edge according to an embodiment of the invention is shown in FIG. 2. It consists of the combination of a bend 22, a ribbed trailing-edge passage 19b with rib-like turbulators 23 at both suction and pressure sides, with a pitch P, and a trailing edge ejection region 21 with a pin field 24 and a cast pressure side bleed 28.

The coolant coming from the flow channel 19a flows in the direction of the arrows through the bend 22 and enters the trailing edge passage 19b. The bend shape is designed to minimize the aerodynamic losses. The bend cross-area is contracting along the flow path with an area contraction ranging from 5% to 15%. The trailing edge passage 19b is lined with turbulators 23 on both the pressure and the suction sides. The turbulators 23 allow to increase the flow turbulence and to improve the heat transfer at the trailing edge passage 19b.

As shown in FIG. 3, the turbulators 23 are shaped over the height e with a height to pitch ratio e/P ranging from 0.05 to 0.15. As the coolant flows up the trailing edge passage 19b, part of it continuously diverts in direction of the blade trailing edge 16 and flows through several rows of pins 24 of a pin field designed to optimize the local heat transfer.

The pin field, shown in FIG. 4-7, is conceived as a stepped pressure drop arrangement helping to reduce the hot to cold variations over the overhang. The pin field is arranged to be staggered with respect to the flow direction (the flow direction is inclined from the horizontal in a range of 30° to 60° depending on the height within the channel). Four rows of pins 24 are arranged in the central region of the pin field with a pin diameter d1 to d4 increasing in the coolant flow direction. The pin height is h, and the height to diameter ratio h/d ranges from 0.5 to 2.0. The pins 24 of the pin field have an axial and radial spacing $s_x$ and $s_y$, with axial and radial spacing to pin diameter ratios $s_x/d$ and $s_y/d$, which vary from 1.5 to 4.0.

Figure 7:
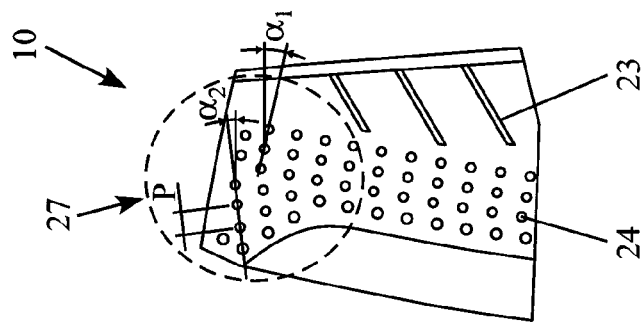
FIG. 7 shows the arrangement of the pins in the tip pin field at the trailing edge of the blade according to FIG. 2.
Figure 6:
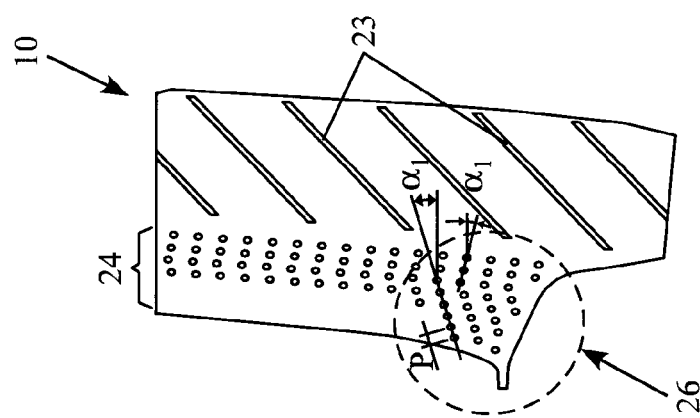
FIG. 6 shows the arrangement of the pins in the hub pin field at the trailing edge of the blade according to FIG. 2.

As shown in FIGS. 6 and 7, in the hub and tip blade regions, local pin field designs, i.e. a widened hub pin field 26 and a widened tip pin field 27 with an increased number of pins, are required in order to meet the local flow, heat transfer and manufacturing criteria. Following the pin field, the coolant flow exits the blade 10 through a slot-like pressure side bleed 28 on the airfoil pressure side and cools the blade trailing edge 16 by flowing along the suction side lip overhang 25 of the pressure side bleed 28.

As shown in FIG. 4, the ratio of the length L of the lip overhang 25 to the pressure side slot width s, L/s, ranges from 7 to 15.

Figure 5:
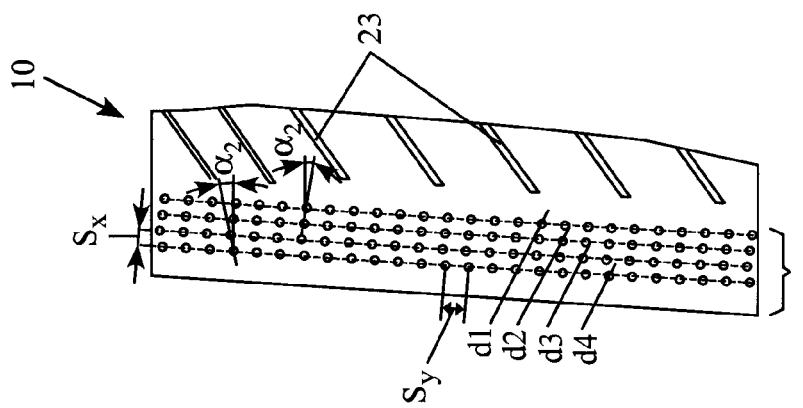
FIG. 5 shows the arrangement of the pins in the middle section of the pin field at the trailing edge of the blade according to FIG. 2.

As shown in FIG. 5-7, the pins arrangement can also be characterized by two angles α1 and α2, which vary in the range between 0° and 30°, whereby α1 (<0) and α2 (>0) denote the angle between axial direction and an inclined row of pins 24, especially within the hub and/or tip pin field 26, 27. Two rows with angles α1 and α2 each are combined to give an overall chevron-like pin arrangement.

The described pin field arrangement (FIG. 5, 6, 7) is designed to improve the heat transfer for a rotating component, here for example a blade. The alignment of the pins rows described by the angles α1 and α2 is specifically designed to enhance the heat transfer when the flow velocity through the pin field presents a radial component due to the presence of centrifugal forces.

It is possible to add a dust hole on the top of the trailing edge passage. The presence of a tip hole/dust hole located at the tip of the trailing edge passage ensures sufficient flow and therefore heat transfer in the tip region of the trailing edge passage.

The characteristics of the blade design according to the invention can be summarized as follows:
 Blade trailing edge cooling;
 Cooling of blade trailing region by combination of lower bend, turbulators, pin field and pressure side bleed coolant ejection;
 Bend with area contraction range 5% to 15%;
 Uniform flow distribution for trailing edge with rotation;
 Trailing edge duct or passage area converging factor in the range 20 to 30;
 Turbulators with height to pitch ratio range from 0.05 to 0.15;
 Pins with height to diameter ratio range from 1.5 to 4.0;
 Pin field design staggered to flow for rotating blade, local pin field design near hub and tip; and
 Pressure side bleed length of the lip to pressure side slot width range from 7 to 15.

What is claimed is:

1. A cooled blade for a gas turbine, said cooled blade comprising:
 a radially extending aerofoil with a leading edge, a trailing edge, a suction side and a pressure side, and wherein a lip overhang is provided on the suction side of the trailing edge, a plurality of radial internal flow channels connected via flow bends to form a multi-pass serpentine for a coolant flow, a trailing edge ejection region is provided for cooling said trailing edge, said trailing edge ejection region comprising a trailing edge passage of said multi-pass serpentine running parallel to said trailing edge and being connected over its entire length with a pressure side bleed, wherein the cooling flow from the trailing edge passage to the pressure side bleed is also determined by a staggered field of pins, provided between said pressure side bleed and said trailing edge passage, wherein the lateral dimension of said pins increasing in a chordwise flow direction; and
 wherein in a hub and tip regions of said blade, a local hub and tip pin field with an increased number of pins is provided in order to meet the local flow, heat transfer and manufacturing criteria and at least within the local hub and tip pin field the pins are arranged in straight rows, which are inclined with respect to an axial direction by a predetermined angle.

2. The cooled blade according to claim 1, wherein the pins have a circular cross section with a predetermined diameter (d) and a predetermined height (h), and the height to diameter ratio h/d for each pin ranges from 0.5 to 2.0.

3. The cooled blade according to claim 1, wherein the pins of said pin field have a predetermined axial and radial spacing ($s_x$, $s_y$), and the axial and radial spacing to pin diameter ratios $s_x/d$ and $s_x/y$ vary from 1.5 to 4.0.

4. The cooled blade according to claim 1, wherein the coolant flows through a bend to enter said trailing edge passage, and the shape of the bend is designed to minimize the aerodynamic losses.

5. The cooled blade according to claim 4, wherein the cross-area of the bend is contracting along the flow direction.

6. The cooled blade according to claim 5, wherein the cross-area of said bend has an area of contraction ranging from 5% to 15%.

7. The cooled blade according to claim 1, wherein the cross-area of the trailing edge passage converges in a radial direction by a factor ranging from 20 to 30.

8. The cooled blade according to claim 1 wherein said trailing-edge passage is lined with turbulators on both the pressure and the suction sides to increase the flow turbulence and to improve the heat transfer.

9. The cooled blade according to claim 8, wherein said turbulators are arranged in the flow direction with a predetermined pitch (P) and have a predetermined turbulator height (e), and that the turbulator height to pitch ratio e/P ranges from 0.05 to 0.15.

10. The cooled blade according to claim 1, wherein said lip overhang has a predetermined length (L), said pressure side bleed has a predetermined slot width(s), and the length of the lip overhang to the pressure side slot width ratio L/s ranges from 7 to 15.

* * * * *